United States Patent [19]

Schindler et al.

[11] 3,919,296

[45] Nov. 11, 1975

[54] PRODUCTION OF 1-AMINOALKANE-1,1-DIPHOSPHONIC ACIDS USING NITRILES, PHOSPHOROUS ACID AND HYDROGEN HALIDE

[75] Inventors: Norbert Schindler, Monheim-Baumberg; Walter Plöger, Hilden Rhineland, both of Germany

[73] Assignee: Henkel & Cie G.m.b.H., Dusseldorf-Holthausen, Germany

[22] Filed: Feb. 13, 1974

[21] Appl. No.: 442,080

Related U.S. Application Data

[63] Continuation of Ser. No. 184,622, Sept. 28, 1971, abandoned.

[30] Foreign Application Priority Data

Oct. 6, 1970 Germany.......................... 2048913

[52] U.S. Cl.............. 260/502.5; 252/8.8; 252/180; 252/DIG. 11; 252/DIG. 17
[51] Int. Cl.²............................................ C07F 9/38
[58] Field of Search................................ 260/502.5

[56] References Cited

UNITED STATES PATENTS 3,565,949  2/1971  Cummins......................... 260/502.5

FOREIGN PATENTS OR APPLICATIONS 1,002,355  2/1957  Germany......................... 260/502.5
995,462    6/1965  United Kingdom.............. 260/502.5

OTHER PUBLICATIONS

Van Wazer, "Phosphorus and its Compounds," Vol. 1, (1958), p. 371.

*Primary Examiner*—Joseph E. Evans
*Attorney, Agent, or Firm*—Hammond & Littell

[57] ABSTRACT

The present invention provides a process for the production of 1-aminoalkane-1,1-diphosphonic acids of the formula

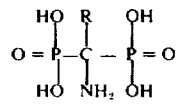

in which R represents a member selected from the group consisting of alkyl with 1 to 12 carbon atoms, phenyl, carboxyalkyl with 2 to 12 carbon atoms, phenylalkyl with 7 to 12 carbon atoms, haloalkyl with 1 to 12 carbon atoms, nitroalkyl with 1 to 12 carbon atoms, cyclohexyl, and sulfonic acid alkyl with 1 to 12 carbon atoms, consisting essentially of reacting an organic nitrile of the formula R'—CN, in which R' represents a member selected from the group consisting of alkyl with 1 to 12 carbon atoms, haloalkyl with 1 to 12 carbon atoms, nitroalkyl with 1 to 12 carbon atoms, carb-lower alkoxyalkyl with 3 to 17 carbon atoms, lower alkoxy-sulfonyl-alkyl with 3 to 16 carbon atoms, cyclohexyl, phenyl, phenylalkyl with 7 to 12 carbon atoms, with phosphorous acid in the presence of a hydrogen halide; and recovering said 1-aminoalkane-1,1-diphosphonic acids.

6 Claims, No Drawings

PRODUCTION OF 1-AMINOALKANE-1,1-DIPHOSPHONIC ACIDS USING NITRILES, PHOSPHOROUS ACID AND HYDROGEN HALIDE

PRIOR APPLICATION

This application is a continuation of Ser. No. 184,622, filed Sept. 28, 1971, and now abandoned.

BACKGROUND OF THE INVENTION

The invention relates to the production of 1-aminoalkane-1,1-diphosphonic acids.

The preparation of 1-aminoalkane-1,1-diphosphonic acids by reacting a nitrile with a phosphorus trihalide and treating the reaction mixture with water is known. The reaction may also be carried out in the presence of organic acids or their anhydrides or an inorganic oxygen-containing acid. This known method has the disadvantage that good yields are obtained only with use of phosphorus tribromide, while with phosphorus trichloride only poor yields are obtained. In this process, phosphorus tribromide must be used in considerable excess with regard to the amount theoretically necessary. Further, in this known reaction, at least 6 moles of HBr or HCl is evolved per mole of nitrile, according to what excess is used.

OBJECTS OF THE INVENTION

It is therefore an object of the present invention to provide an improved process for the production of 1-aminoalkane-1,1-diphosphonic acids by reacting a nitrile with phosphorus acid in the presence of a hydrogen halide, for example HCl, HBr, and HI.

It is another object of the present invention to provide a process for the production of 1-aminoalkane-1,1-diphosphonic acids of the formula

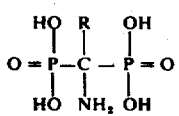

in which R represents a member selected from the group consisting of alkyl with 1 to 12 carbon atoms, phenyl, carboxyalkyl with 2 to 12 carbon atoms, phenylalkyl with 7 to 12 carbon atoms, haloalkyl with 1 to 12 carbon atoms, nitroalkyl with 1 to 12 carbon atoms, cyclohexyl, and sulfonic acid alkyl with 1 to 12 carbon atoms, consisting essentially of reacting an organic nitrile of the formula R'—CN, in which R' represents a member selected from the group consisting of alkyl with 1 to 12 carbon atoms, haloalkyl with 1 to 12 carbon atoms, nitroalkyl with 1 to 12 carbon atoms, carb-lower alkoxyalkyl with 3 to 17 carbon atoms, lower alkoxy-sulfonyl-alkyl with 3 to 16 carbon atoms, cyclohexyl, phenyl, phenylalkyl with 7 to 12 carbon atoms, with phosphorus acid in the presence of a hydrogen halide; and recovering said 1-aminoalkane-1,1-diphosphonic acids.

Other and further objects of the present invention will become apparent as the description thereof proceeds.

DESCRIPTION OF THE INVENTION

The present invention provides a process for the production of 1-aminoalkane-1,1-diphosphonic acids of the formula

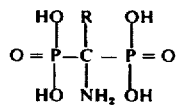

in which R represents a member selected from the group consisting of alkyl with 1 to 12 carbon atoms, phenyl, carboxyalkyl with 2 to 12 carbon atoms, phenylalkyl with 7 to 12 carbon atoms, haloalkyl with 1 to 12 carbon atoms, nitroalkyl with 1 to 12 carbon atoms, cyclohexyl, and sulfonic acid alkyl with 1 to 12 carbon atoms, consisting essentially of reacting an organic nitrile of the formula R'—CN, in which R' represents a member selected from the group consisting of alkyl with 1 to 12 carbon atoms, haloalkyl with 1 to 12 carbon atoms, nitroalkyl with 1 to 12 carbon atoms, carb-lower alkoxyalkyl with 3 to 17 carbon atoms, lower alkoxy-sulfonyl-alkyl with 3 to 16 carbon atoms, cyclohexyl, phenyl, phenylalkyl with 7 to 12 carbon atoms, with phosphorous acid in the presence of a hydrogen halide; and recovering said 1-aminoalkane-1,1-diphosphonic acids.

Suitable organic nitriles are those in which the hydrocarbon residue contains 1 to 12 carbon atoms, and this residue may be an aliphatic, branched or straight chain residue, which if desired may be substituted. Suitable substituents are, especially, halogen atoms, $NO_2$, $SO_3$, R'' or COOR'' in which R'' is an alkyl group with 1 to 4 carbon atoms. However, the hydrocarbon residue may also be a cyclo aliphatic or an aryl or an alkyl residue.

Preferably R represents a member selected from the group consisting of alkyl with 1 to 12 carbon atoms, phenyl, carboxyalkyl with 2 to 12 carbon atoms, phenylalkyl with 7 to 12 carbon atoms, haloalkyl with 1 to 12 carbon atoms, nitroalkyl with 1 to 12 carbon atoms, cyclohexyl, and sulfonic acid alkyl with 1 to 12 carbon atoms.

The following nitriles are particularly suitable starting materials: acetonitrile, propionitrile, hexylnitrile, nonylnitrile, dodecylnitrile, cyanoacetic acid ethyl ester, cyclohexylnitrile, phenylacetic acid nitrile and benzonitrile.

The organic nitriles and phosphorus acid are suitably used in the molar ratio of 1:1.5 to 1:0.5, preferably 1:1. The reaction is carried out in the presence of a hydrogen halide, and the amount of hydrogen chloride, hydrogen bromide or hydrogen iodide may vary within specified limits. In general, about 0.35 to 1 mole of hydrogen halide is used per mole of nitrile.

A preferred form of the process comprises reacting the individual components simultaneously, and it is then advantageous to bring the hydrogen halide into contact with the surface of the mixture of nitrile and phosphorous acid, since the reaction mixture becomes viscous during the course of the reaction and difficulties may occur if the hydrogen halide is added into the reaction mixture. However, the nitrile may also be mixed first with the hydrogen halide and the phosphorus acid may then be added.

After the components are mixed, the reaction takes place with the evolution of hydrogen halide and a rise in temperature. An increase in viscosity and consolidation of the reaction mixture then generally occurs. Cooling however, is generally unnecessary.

When hydrogen bromide or hydrogen iodide is used, it is advantageous to conduct the reaction at temperatures from 0° to 30°C. On the other hand, if hydrogen chloride is used, it has been found specially advantageous to use temperatures from −20° to +5°C, since under these conditions the best yields are obtained.

The use of solvents is not necessary for carrying out the reaction. If desired, however, solvents such as benzene, toluene, carbon tetrachloride, chloroform, nitromethane, tetrachloroethane or other inert solvents may also be used.

In order to isolate and purify the 1-aminoalkane-1,1-diphosphonic acids the reaction mixture is treated with water. If the 1-aminoalkane-1,1-diphosphonic acids are readily soluble, they are then precipitated from the aqueous solution by addition of suitable solvents such as acetone, methyl alcohol, ethyl alcohol or isopropyl alcohol.

The advantages of the process consist, inter alia, in that the 1-aminoalkane-1,1-diphosphonic acids can be obtained in good yields using both hydrogen bromide and hydrogen chloride. Compared with the hitherto known processes, the reaction time is also considerably reduced. A further advantage of the process is that the hydrogen halide used is set free again at the end of the reaction and can be used for a fresh batch. In the known processes it was not possible to recycle the hydrogen halide for use in further reactions.

The 1-aminoalkane-1,1-diphosphonic acids prepared by the new process may be used as complex-forming compounds for many technical purposes. For example, they may be used for water softening, in cleaning processes, especially bottle washing, or for the removal of deposits from fabrics in washing processes. Furthermore, they are suitable additions to dyebaths for textiles as complexes which bind metal ions that give undesired shades of color.

The present invention will be further described with reference to the following specific description without being limitative in any manner.

EXAMPLE 1

Dry hydrogen chloride at about −15°C is brought into contact with the surface of a mixture of 41 g (1.0 mole) of acetonitrile and 82 g (1.0 mole) of phosphorous acid while stirring the mixture until saturation of the gas therein is reached. After removal of the cooling means, the reaction mixture is heated to 30°–40°C and simultaneously hardens to a colorless solid body with evolution of HCl. After cooling, this is dissolved in water and 1-aminoethane-1,1-diphosphonic acid separates on addition of acetone. The yield was 45 g.

EXAMPLE 2

0.7 mole of gaseous hydrogen bromide is brought into contact with the surface of a mixture of 41 g (1.0 mole) of acetonitrile and 82 g (1.0 mole) of phosphorous acid whereby, while stirring the mixture without external cooling, the temperature rises to about 100°C. At the same time the solution becomes cloudy and sets. After cooling the product is purified as described in Example 1. The yield of 1-aminoethane-1,1-diphosphonic acid amounts to 48 g.

EXAMPLE 3

Dry hydrogen chloride gas at about −15°C is brought into contact with the surface of a mixture of 55 g (1.0 mole) of propionitrile and 82 g (1.0 mole) of phosphorous acid with stirring of the mixture until saturation of the gas therein is reached. After removal of the cooling means, the reaction mixture slowly heats up to 60° to 80°C. At the same time the mixture consolidates to a transparent glassy mass. On boiling with water, about half of the 1-aminopropane-1,1-diphosphonic acid formed remains in suspension. The fraction precipitated from the aqueous solution with acetone is purified with a cation exchanger. Total yield 75 g.

EXAMPLE 4

About 1 mole of hydrogen bromide gas at room temperature is brought into contact with the surface of a mixture of 100 g (0.65 mole) of nonyl cyanide and 53 g (0.65 mole) of phosphorous acid while stirring the mixture. The temperature thereby rises to 60°–80°C, and the reaction product becomes highly viscous. On boiling with water, 85 g of 1-aminodecane-1,1-diphosphonic acid remain.

EXAMPLE 5

About 0.6 mole of hydrogen bromide gas is brought into contact with the surface of a mixture of 113 g (1.0 mole) of cyanoacetic acid ethyl ester and 82 g (1.0 mole) of phosphorous acid while stirring without cooling the mixture. Heating up to about 90°C thereby occurs. The viscous reaction product is dissolved in water after cooling. On addition of acetone, the 1-amino-2-carboxy-ethane-1,1-diphosphonic acid is precipitated as an oil, which gradually crystallizes. Yield 55 g.

EXAMPLE 6

A mixture of 117 g (1.0 mole) of benzyl cyanide and 82 g (1.0 mole) of phosphorous acid is saturated at about −15°C with hydrogen chloride gas while stirring the mixture which is then further stirred without external cooling. With slight heating, evolution of HCl takes place, and the now viscous oil solidifies on cooling to a hard glass. On boiling with water the 1-amino-2-phenyl-ethane-1,1-diphosphonic acid separates as white flakes. Yield 120 g.

EXAMPLE 7

About 0.4 mole of hydrogen bromide gas without external cooling is brought into contact with the surface of a mixture of 117 g (1.0 mole) of benzylcyanide and 82 g (1.0 mole) of phosphorous acid without stirring this mixture. The solution thereby heats up to about 30°C. After cooling, the glassy reaction product is purified as described in Example 6. The yield of 1-amino-2-phenyl-ethane-1,1-diphosphonic acid amounts to 65 g.

EXAMPLE 8

A mixture of 103 g (1.0 mole) of benzonitrile and 82 g (1.0 mole) of phosphorous acid is saturated at about −20°C with dry hydrogen chloride gas with stirring of the mixture. The mixture is then further stirred without external cooling. A glassy mass is formed with evolution of HCl and with moderate spontaneous heating. The mass is then dissolved in hot water. The 1-amino-1-phenyl-methane-1,1-diphosphonic acid then remains as colorless flakes. Yield 45 g.

EXAMPLE 9

About 0.5 mole of hydrogen bromide gas is brought into contact with the surface of a mixture of 103 g (1.0 mole) of benzyl cyanide and 82 g (1.0 mole) of phosphorous acid without external cooling. A clear solution is formed upon heating up to 40°–60°C and this quickly becomes more viscous and on cooling solidifies to a glassy mass. On boiling with hot water, 1-amino-2-phenyl-ethane-1,1-diphosphonic acid remains as colorless flakes. Yield 50 g.

EXAMPLE 10

For the preparation of 1-aminoethane-1,1-diphosphonic acid, dry hydrogen iodide gas at room temperature is brought into contact with the surface of a mixture of 10 g (0.25 mole) of acetonitrile and 20.5 g (0.25 mole) of phosphorous acid with stirring of the mixture. The temperature of the reaction mixture thereby rises to over 100°C. The brown viscous reaction product obtained is dissolved in water, filtered from insoluble constituents and the filtrate is treated with sufficient acetone for the complete precipitation of the colorless oil, which slowly crystallizes.

EXAMPLE 11

0.35 mole of hydrogen bromide gas is brought into contact with the surface of a mixture of 40 g (1 mole) of acetonitrile, 82 g (1 mole) of phosphorous acid and 50 ml of chloroform without external cooling, but with stirring of the mixture. The temperature of the reaction mixtures rises to about 50° with formation of two liquid phases and the lower phase solidifies after a short time. The liquid fraction is separated and the residue is dissolved in water. Then the aqueous solution is treated with acetone, whereby crystalline 1-aminoethane-1,1-diphosphonic acid is precipitated.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. In the process for the production of 1-aminoalkane-1,1-diphosphonic acids of the formula

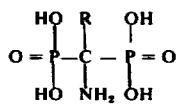

in which R represents a member selected from the group consisting of alkyl with 1 to 12 carbon atoms, phenyl, carboxyalkyl with 2 to 12 carbon atoms, phenylalkyl with 7 to 12 carbon atoms, haloalkyl with 1 to 12 carbon atoms, nitroalkyl with 1 to 12 carbon atoms, cyclohexyl, and sulfonic acid alkyl with 1 to 12 carbon atoms, the steps comprising contacting a reactant mixture consisting essentially of (a) an organic nitrile of the formula R'—CN, in which R' represents a member selected from the group consisting of alkyl with 1 to 12 carbon atoms, haloalkyl with 1 to 12 carbon atoms, nitroalkyl with 1 to 12 carbon atoms, (carb-lower alkoxy)- alkyl with 3 to 17 carbon atoms, lower alkoxy-sulfonyl-alkyl with 3 to 16 carbon atoms, cyclohexyl, phenyl, phenylalkyl with 7 to 12 carbon atoms, and (b) phosphorous acid, with (c) a single hydrogen halide gas selected from the group consisting of hydrogen bromide gas and hydrogen iodide gas at 0° to 30°C, with said nitrile and said phosphorous acid being mixed together and present in the molar ratio of from 1:1.5 to 1:0.5 and from about 0.35 to 1 mole of said hydrogen halide gas being present per mole of said organic nitrile; conducting the reaction without external cooling; and recovering said 1-aminoalkane-1,1-diphosphonic acids.

2. In the process for the production of 1-aminoalkane-1,1-diphosphonic acids of the formula

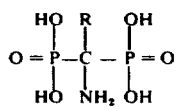

in which R represents a member selected from the group consisting of alkyl with 1 to 12 carbon atoms, phenyl, carboxyalkyl with 2 to 12 carbon atoms, phenylalkyl with 7 to 12 carbon atoms, haloalkyl with 1 to 12 carbon atoms, nitroalkyl with 1 to 12 carbon atoms, cyclohexyl, and sulfonic acid alkyl with 1 to 12 carbon atoms, the steps comprising mixing reactant materials consisting essentially of (a) an organic nitrile of the formula R'—CN, in which R' represents a member selected from the group consisting of alkyl with 1 to 12 carbon atoms, haloalkyl with 1 to 12 carbon atoms, nitroalkyl with 1 to 12 carbon atoms, (carb-lower alkoxy)- alkyl with 3 to 17 carbon atoms, lower alkoxy-sulfonyl-alkyl with 3 to 16 carbon atoms, cyclohexyl, phenyl, phenylalkyl with 7 to 12 carbon atoms, and (b) phosphorous acid and contacting said mixture with hydrogen chloride gas at −20° to +5°C, while stirring until saturation of the gas therein is reached, with said nitrile and said phosphorous acid being present in the molar ratio of from 1:1.5 to 1:0.5 and from about 0.35 to 1 mole of hydrogen chloride being present per mole of said organic nitrile: thereafter conducting the reaction without external cooling; and recovering said 1-aminoalkane-1,1-diphosphonic acids.

3. The process of claim 1 in which the nitrile and phosphorous acid are present in a molar ratio of substantially 1:1.

4. The process of claim 1 in which the hydrogen halide gas is hydrogen bromide.

5. The process of claim 1 in which the hydrogen halide gas is hydrogen iodide.

6. The process of claim 2 in which the nitrile and phosphorous acid are present in a molar ratio of substantially 1:1.

* * * * *